Aug. 5, 1924.
G. A. DUMAS
1,503,527
CHOCOLATE COATING MACHINE
Filed July 10, 1923    5 Sheets-Sheet 3
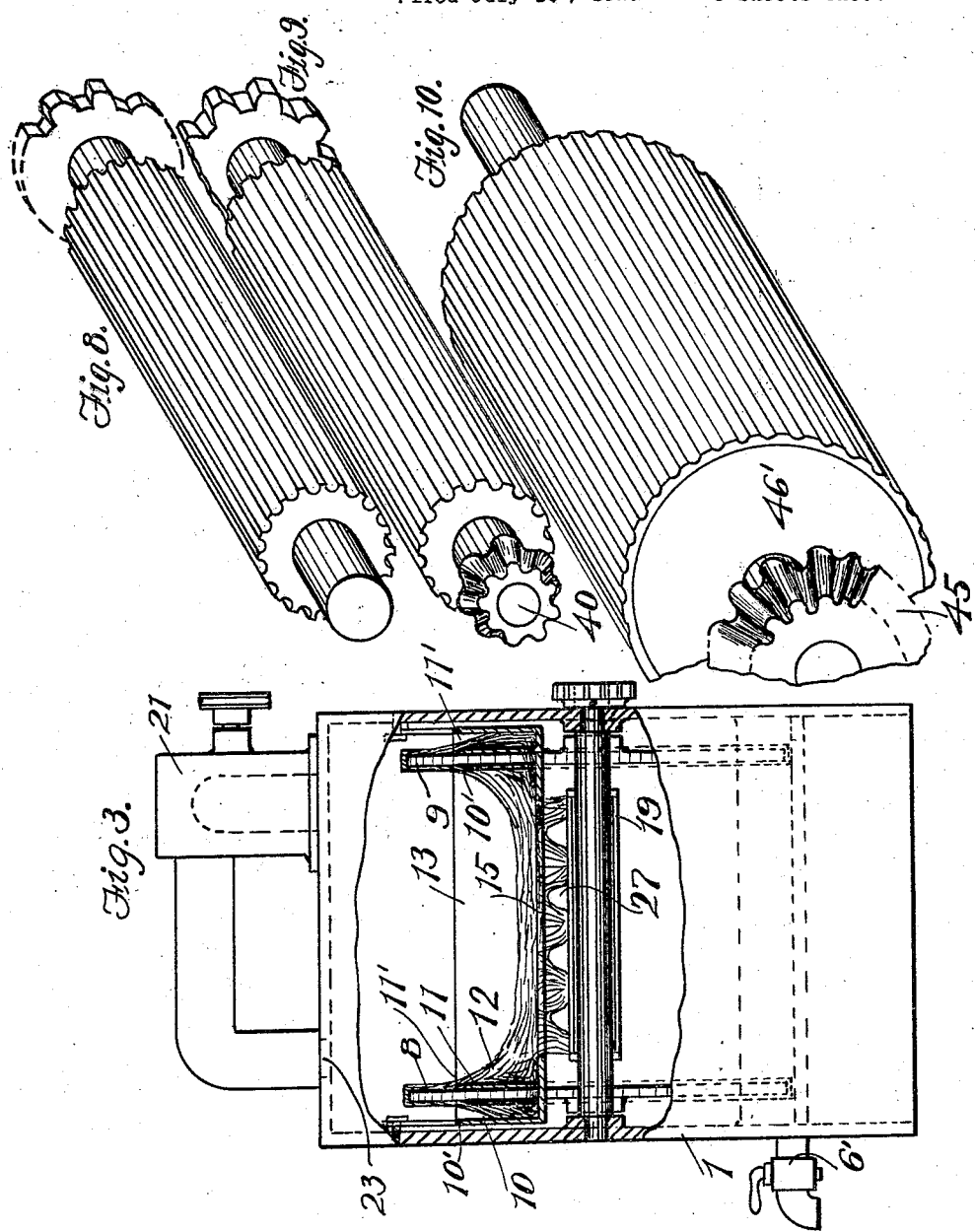
INVENTOR.
George A. Dumas,
BY
Harry W. Bown.
ATTORNEY.

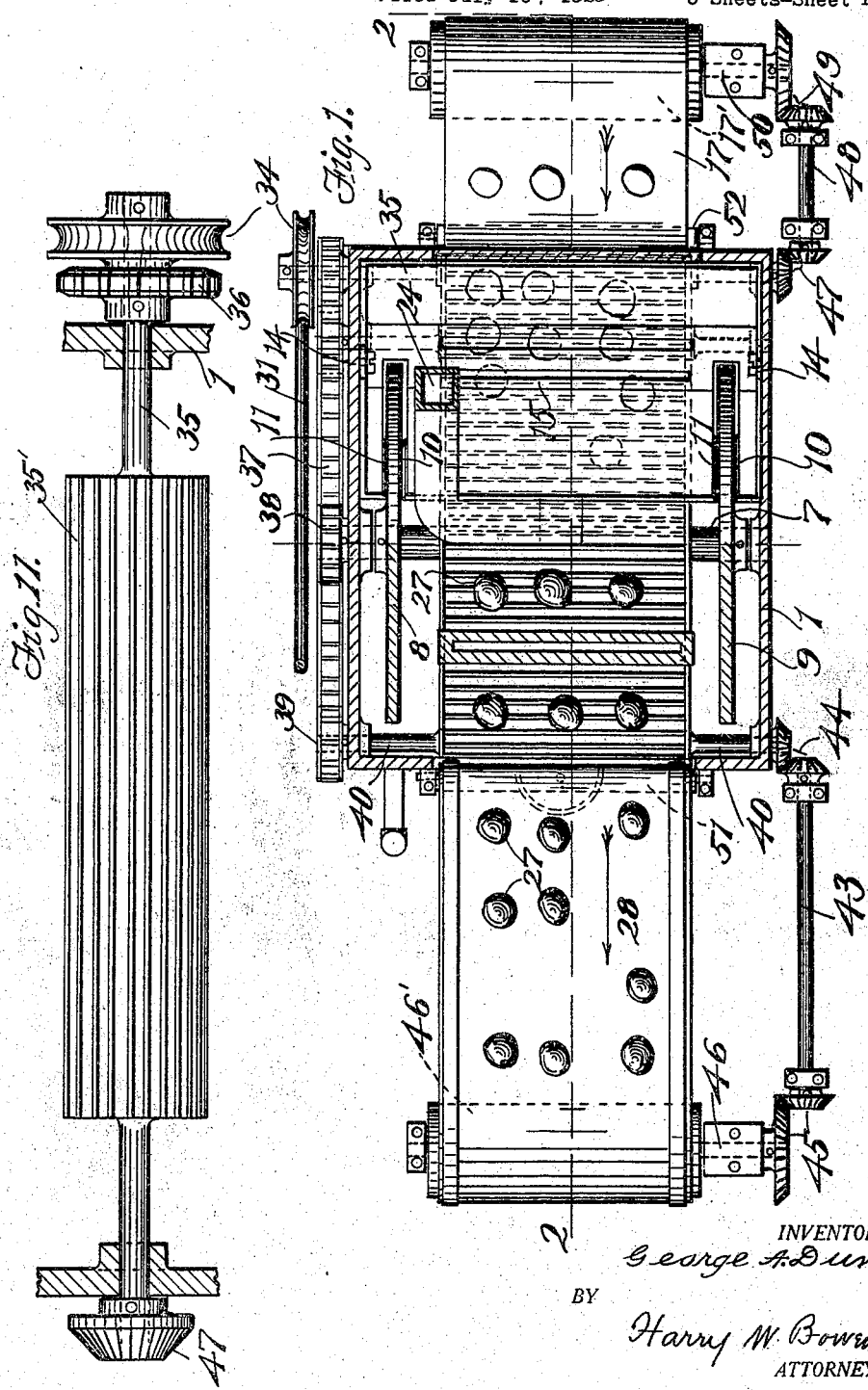

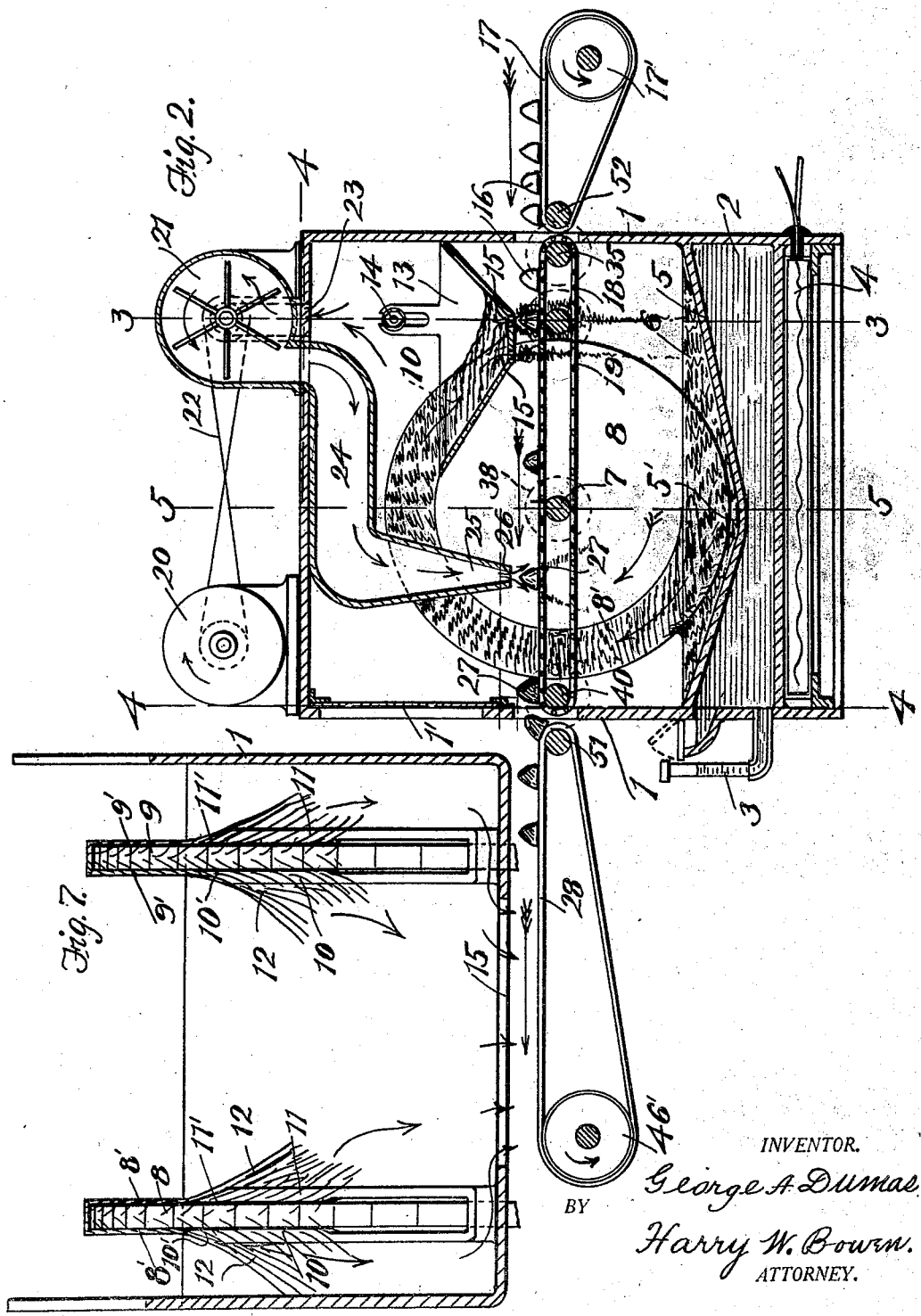

Aug. 5, 1924.  
G. A. DUMAS  
1,503,527  
CHOCOLATE COATING MACHINE  
Filed July 10, 1923  
5 Sheets-Sheet 4
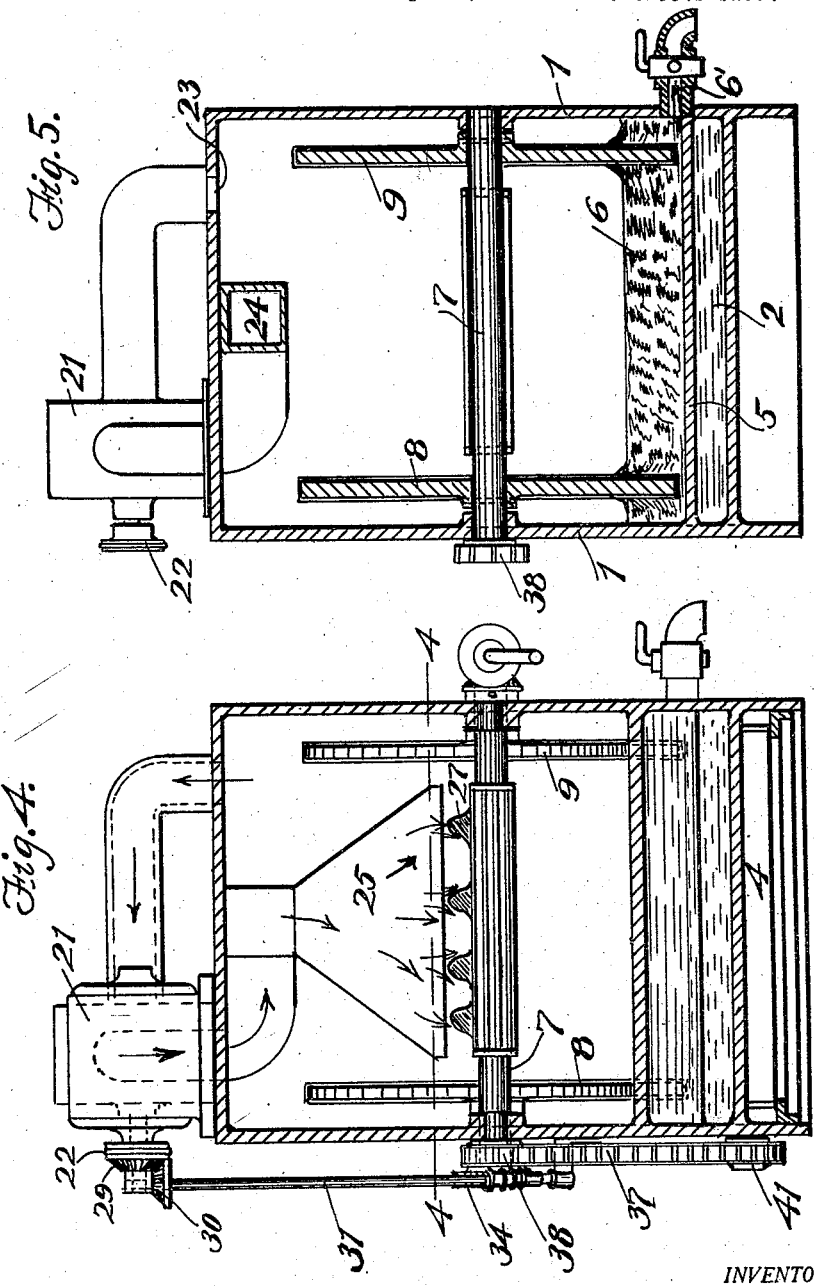
INVENTOR.  
George A. Dumas.  
BY  
Harry W. Bowen.  
ATTORNEY.

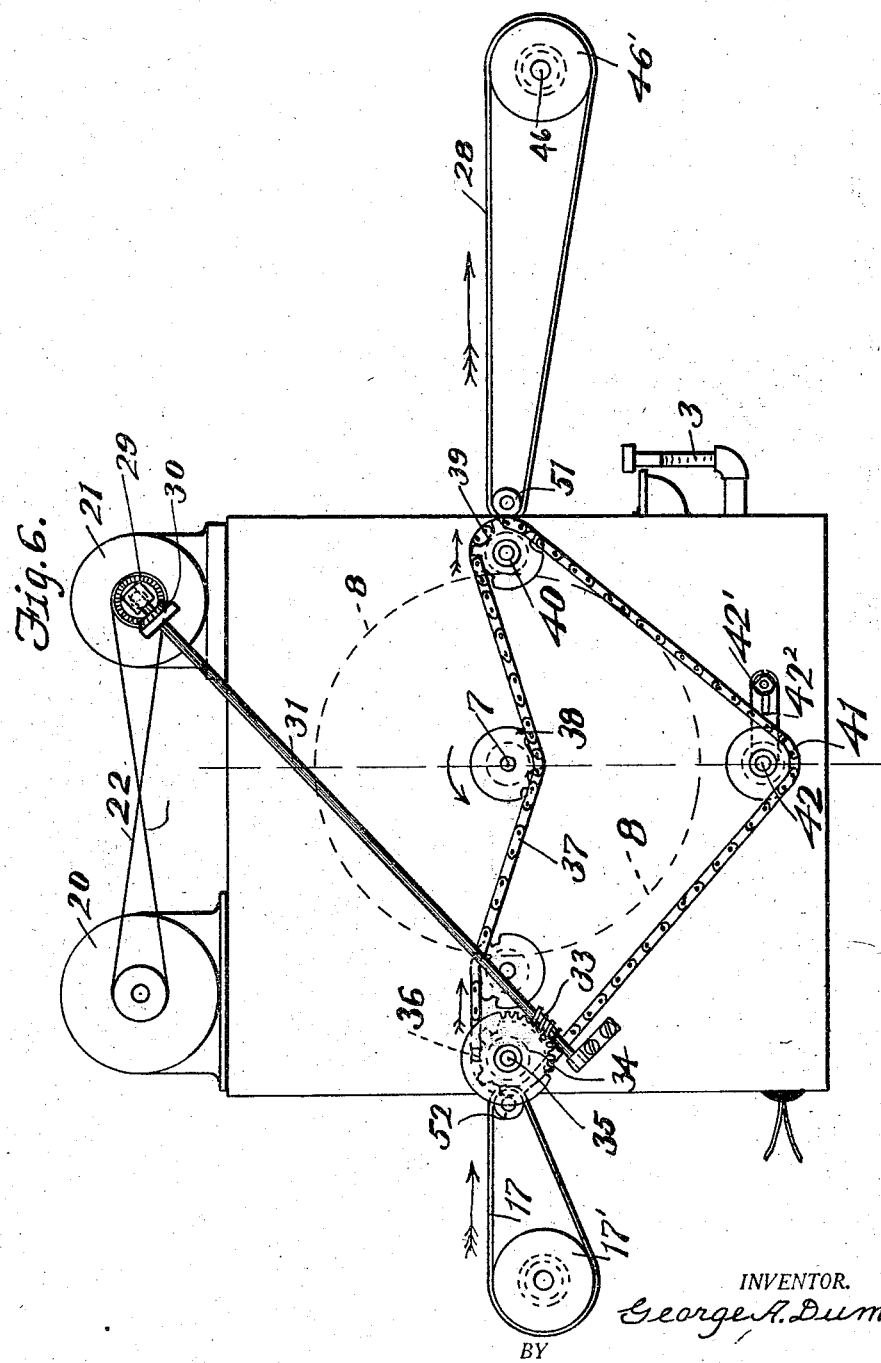

Patented Aug. 5, 1924.

1,503,527

UNITED STATES PATENT OFFICE.

GEORGE A. DUMAS, OF CHICOPEE FALLS, MASSACHUSETTS.

CHOCOLATE-COATING MACHINE.

Application filed July 10, 1923. Serial No. 650,710.

*To all whom it may concern:*

Be it known that I, GEORGE A. DUMAS, a citizen of the United States of America, residing at Chicopee Falls, county of Hampden, Commonwealth of Massachusetts, have invented certain new and useful Improvements in Chocolate-Coating Machines, of which the following is a specification.

This invention relates to improvements in confectionery making machines and particularly to improvements in machines for coating the creams or cores of what is known as chocolate creams, also designed for covering or coating confections in which a nut, or other material is used for the cores.

Heretofore, it has been a common practice to place the cores or creams on a conveyor at the entrance end of the machine which conveyor delivers the cores into the machine and onto another conveyor, and suitable means are provided for flooding the cores or creams with liquid chocolate which is maintained at a suitable temperature. The present invention embodies in general, the same idea but this particular invention relates to the means for carrying or conveying the liquid chocolate from the supply tank and elevating the same so that it will flow downward by gravity onto the creams or cores, as they are carried through the machine.

Broadly, the elevating means comprises a plurality of disks which are rotated in a supply of liquid chocolate so that a portion of the opposite faces is constantly immersed in the chocolate whereby the material will adhere to the rotating disk and will be carried upward. It is then scraped off or removed from the disks and collected in a suitable hopper from which it flows by gravity onto the conveyor on which is carried the creams or cores. Suitable means are provided for operating the disks and the various elements, including a fan for supplying a current of air under pressure for removing the surplus chocolate material from the cores, as will be fully described.

Referring to the drawings:

Fig. 1 is a top plan view showing the complete machine with the upper portion of the enclosing casing removed showing the rotatable disks and illustrating the scraper means for removing the chocolate from the disks.

Fig. 2 is a vertical sectional view on the line 2—2 of Fig. 1 showing the conveyor devices, one of the rotatable chocolate elevating disks, the scraper engaging the same and the compressed air blower mechanism.

Fig. 3 is a vertical sectional view on the line 3—3 of Fig. 2 showing the operation of the scraper devices which engage the elevating disks, the hopper for collecting the removed chocolate and the same flowing from the hopper onto the cores or creams.

Fig. 4 is a vertical sectional view on the line 4—4 of Fig. 2 looking toward the right illustrating the compressed air blower mechanism and the devices for operating the conveyor rolls and fan, also the two chocolate elevating disks.

Fig. 5 is a sectional view on the line 5—5 of Fig. 2 showing in detail the rotatable disks and the compressed air fan.

Fig. 6 is a side elevational view of Fig. 1 looking towards the opposite or farther side of the casing, illustrating the driving means between the roller and the means for driving the various parts of the machine; it is also a view looking from the left hand side of Fig. 4.

Fig. 7 is a detail view substantially on the same plane as Fig. 3 showing the chocolate being removed from the rotatable disks and flowing from the hopper.

Figs. 8, 9, and 10 are detail views of the driving rollers over which the conveyor belts pass, and Fig. 11 is a detail view of one of the conveyor rolls showing the worm gear which operates the same.

Referring to the drawings in detail:

1 designates an enclosing casing member which is provided with a reservoir 2 at the bottom portion for receiving water or other warming medium. 3 is a gage for indicating the level of the water therein. 4 is a suitable water heating device, preferably electric, for maintaining the water at a definite temperature usually about 90° Fahrenheit. Located in the bottom of the casing 1 and above the water reservoir 2 is a bottom plate 5 for receiving and holding the melted chocolate 6. This bottom is made inclined in opposite directions as shown in order to permit the chocolate to flow to the lowest part 5′ of the receptacle. Rotatably mounted in the sides of the receptacle 1 is a shaft 7 and attached to the shaft 7 are the two disks 8 and 9 which revolve in the liquid chocolate indicated at 6. As these disks are rotated the chocolate adheres to the opposite sides thereof as indicated by the shaded portions, 8' and 9'. It is carried upward and around by the disks until it engages the scraper devices 10 and 11 which are located on opposite sides of the disks as shown in Figs. 1, 3, and 7 where it is continuously scraped or removed from these disks as indicated by the lines 12. These scrapers are bevelled or sharpened as indicated at 10' and 11'. As the liquid chocolate leaves the scraper device it falls into the hopper 13 shown in Figs. 2 and 5. This hopper is made adjustable by means of the bolt and slot connection 14 whereby it may be tipped or elevated as desired. At the bottom of the hopper are the discharge openings 15 through which the chocolate passes onto the creams or cores indicated at 16 as they enter the machine. These cores are placed on the supply conveyor belt 17 at the entrance end of the machine and from this belt they pass onto the wire or link belt 18 the wires of which are indicated at 19; they are spaced from each other to permit the surplus chocolate to flow downward through the same and back into the reservoir or supply 6.

For the purpose of removing the surplus chocolate from the cores, a suitable fan or compressed air blower mechanism is provided which includes a main driving motor 20. This motor is belted to the shaft of the fan 21 as indicated at 22. The lower side of the fan casing opens into the upper portion of the main casing 1 as shown at 23. The warm air is drawn into the fan and is discharged through the pipe 24 where it passes downward as indicated at 25 and escapes through the narrow slit or opening 26 that terminates a short distance above the interiorly located conveyor 19 whereby the current of air will remove any surplus chocolate. The coated confections, indicated at 27, now pass from the conveyor 19 onto the conveyor 28, as shown, and from this conveyor they pass to the cooling apparatus (not shown) which does not form a part of this invention.

Referring now to the driving mechanism. Attached to the shaft of the fan 21 is a bevelled gear 29 (see Fig. 6) which drives the gear 30. Attached to this gear is a shaft 31 carrying the worm 33 that engages the worm gear 34 which gear is attached to a shaft 35 and mounted on the shaft 35 is the sprocket gear 36 and engaging the sprocket gear is the sprocket chain 37. This chain engages the gear 38 which is mounted on the shaft 7 that drives the two chocolate elevating disks 8 and 9, and passes over the sprocket gear 39 on the shaft 40 which operates the conveyor 28. The chain 37 passes over the adjustable sprocket gear 41 which is mounted on the pin 42 and the tension of the chain adjusted by the nut 42' and arm 42². The shaft 40 is geared to the shaft 43 by means of the bevel gears 44 and by means of the bevelled gears 45 the shaft 46 is driven, which operates the roller 46' which drives the conveyor belt 28 already referred to for removing the completed creams from the machine and into the cooling apparatus. The shaft 35 through the bevel gears 47, shaft 48, and gears 49, operate the shaft 50 which drives the conveyor belt 17 at the entrance end of the machine by means of the roller 17'. The belts 17 and 28 pass over the idler rollers 51 and 52. It is also to be understood that the surface speed of the gears and the conveyor belts is identical.

The casing 1 is provided with a window 1' and a draw off valve 6' for the chocolate 6.

What I claim is:

1. In combination, a machine for coating confections, an inclosing casing having a receptacle therein for receiving a coating material, rotatable disks located in the receptacle and having a portion of their opposite surfaces immersed in the coating material, means for rotating the disks, means for removing the coating material only from the sides of the disks, a hopper to receive the removed material, said hopper having a discharge outlet opening, and conveyor mechanisms for receiving the material to be coated, the conveyor which carries the material to be coated being located below the outlet openings of the hopper, and means for actuating the conveyors for removing the coated confections from the machine.

2. In combination, a confectionery coating machine, comprising a receptacle for receiving a coating material, a rotatable disk mounted to revolve in the coating material, means for rotating the disk, means for removing the material from the side of the disk and means for permitting the removed material to flow onto the article to be coated, and a blower device for supplying air under pressure to remove the surplus material from the articles after being coated.

3. In a confectionery coating machine, a receptacle for containing the coating material, as liquid chocolate, a disk rotatably mounted in the receptacle with its lower portion passing through the coating material for elevating the material above the article to be coated, means for removing the coating material from the opposite sides of the portion of the disk which is immersed in the material as it is rotated, the coating material removing means being located only at the opposite upper sides portion of the disk whereby the said material will be removed when the disk is rotated as described.

4. In combination, a coating machine, a receptacle for receiving the coating material, means for maintaining the same at a definite temperature, a plurality of rotatably mounted flat disks which pass through the coating material for taking up a portion of the material, means engaging only the opposite sides of the disks, for removing the material.

5. In a machine for coating confections, the combination with an inclosing casing for receiving the coating material, a rotatable disk partially immersed in the material, a conveyor belt located in said casing, conveyor belts at the opposite or entrance side and end respectively of the casing for conveying articles to be coated onto the conveyor which is located in the casing of the machine, a hopper for receiving the coating material and formed with an outlet opening for discharging the material onto the articles on the conveyor to be coated, said hopper having means for collecting the coating material from the rotatable disk and engaging the opposite sides or faces of the same, means for rotating the disk.

6. In combination, a receptacle for receiving a confectionery coating material, a disk rotatably mounted and revolvable therein, means for continuously removing the material from the sides of the disk as it is rotated, and means for permitting the removed material to flow onto an article to be coated.

7. An elevating device for a viscous material for chocolate or the like, comprising in combination, a receptacle for containing the material, a rotatable shaft, a disk attached to the shaft and rotatable in the said material, the material adhering to the sides of the disk as it is rotated and is carried upward by the disk, and means comprising scrapers which are located in close proximity to the sides of the disk for removing the material from the disk.

8. An elevating mechanism for conveying a viscous coating material from a containing receptacle to a hopper or receiving member and comprising a rotatably mounted disk, a scraper arranged for engaging the sides of the disk and located in the hopper.

9. In a confectionery coating machine, the combination, a supply receptacle in which the coating material is placed, disks having parallel sides rotatably mounted in the receptacle for collecting and elevating the material, a scraper engaging each of the opposite sides of the disks, a hopper for receiving the material which is removed from the disks.

GEORGE A. DUMAS.